(12) United States Patent
Gremaud et al.

(10) Patent No.: US 9,191,621 B2
(45) Date of Patent: Nov. 17, 2015

(54) SYSTEM AND METHOD TO RECORD ENCRYPTED CONTENT WITH ACCESS CONDITIONS

(75) Inventors: Fabien Gremaud, Chatel-St. Denis (CH); Nicolas Fischer, Versoix (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 336 days.

(21) Appl. No.: 13/990,979

(22) PCT Filed: Dec. 1, 2011

(86) PCT No.: PCT/EP2011/071571
§ 371 (c)(1),
(2), (4) Date: Jul. 9, 2013

(87) PCT Pub. No.: WO2012/072772
PCT Pub. Date: Jun. 7, 2012

(65) Prior Publication Data
US 2013/0279694 A1    Oct. 24, 2013

Related U.S. Application Data

(60) Provisional application No. 61/418,893, filed on Dec. 2, 2010.

(51) Int. Cl.
*H04N 7/167* (2011.01)
*H04N 21/418* (2011.01)
(Continued)

(52) U.S. Cl.
CPC ............ *H04N 7/167* (2013.01); *H04N 21/4181* (2013.01); *H04N 21/4334* (2013.01); *H04N 21/4408* (2013.01)

(58) Field of Classification Search
USPC ........................................................ 380/211
See application file for complete search history.

(56) References Cited

U.S. PATENT DOCUMENTS

| | | |
|---|---|---|
| 4,200,770 A | 4/1980 | Hellman et al. |
| 2003/0061477 A1 | 3/2003 | Kahn et al. |

(Continued)

FOREIGN PATENT DOCUMENTS

| | | |
|---|---|---|
| EP | 1187477 A1 | 3/2002 |
| EP | 1215905 A2 | 6/2002 |

(Continued)

OTHER PUBLICATIONS

International Search Report PCT/ISA/210 for International Application No. PCT/EP2011/071571 Dated Jan. 18, 2012.

(Continued)

*Primary Examiner* — Tu Nguyen
(74) *Attorney, Agent, or Firm* — Harness, Dickey & Pierce, P.L.C.

(57) ABSTRACT

A television event may be consumed after been stored in a mass memory of a multimedia unit, but still fully relies on the security of a secure device. A conversion of a received content aims at firstly descrambling the content using control words included in entitlement control messages and immediately re-encrypting the descrambled content by a unique key generated specifically for this content. Access conditions attached to the entitlement control message containing the control word are temporarily stored and once the decryption is terminated, the secure device produces an information block. This information block containing for example access conditions and an identifier of the content is either stored into a secure memory of the secure device or stored in the mass memory with the encrypted content. The unique key is made up of a combination of a root key specific to the secure device and the information block.

18 Claims, 2 Drawing Sheets

(51) Int. Cl.
*H04N 21/433* (2011.01)
*H04N 21/4408* (2011.01)

(56) References Cited

U.S. PATENT DOCUMENTS

| | | | |
|---|---|---|---|
| 2004/0073954 A1 | 4/2004 | Bjordammen et al. | |
| 2006/0015615 A1* | 1/2006 | Merle et al. | 709/225 |
| 2008/0270308 A1 | 10/2008 | Peterka et al. | |
| 2008/0271076 A1 | 10/2008 | Schlack | |
| 2008/0279379 A1* | 11/2008 | Muijen | 380/228 |
| 2008/0279386 A1 | 11/2008 | Kahn et al. | |
| 2011/0038481 A1* | 2/2011 | Modave et al. | 380/277 |

FOREIGN PATENT DOCUMENTS

| | | |
|---|---|---|
| EP | 1078524 B1 | 8/2002 |
| EP | 1408497 A1 | 4/2004 |
| WO | WO-0057636 A1 | 9/2000 |
| WO | WO-01/80563 A1 | 10/2001 |
| WO | WO-03079683 A2 | 9/2003 |
| WO | WO-03107665 A1 | 12/2003 |

OTHER PUBLICATIONS

Written Opinion of the International Searching Authority PCT/ISA/237 for International Application No. PCT/EP2011/071571, Jan. 18, 2012.

\* cited by examiner

SYSTEM AND METHOD TO RECORD ENCRYPTED CONTENT WITH ACCESS CONDITIONS

This application is the national phase under 35 U.S.C. §371 of PCT International Application No. PCT/EP2011/071571 which has an International filing date of Dec. 1, 2011, which designated the United States of America and which claims priority to U.S. application No. 61/418,893 filed Dec. 2, 2010, the entire contents of each of which are hereby incorporated herein by reference.

FIELD OF THE INVENTION

The present invention relates to the field of Pay-TV, in particular to the processing of a content stored by a user. Content is broadcast in an encrypted form to be received by multimedia units which are configured for recording and playback the content once decrypted when predefined access conditions are fulfilled.

TECHNICAL BACKGROUND

The development of storage on a hard disk has opened up new applications such as television broadcast storage and the preloading of films or other events proposed for purchase.

In a well known method, to be able to visualize a Pay-TV event, such as a film, a sports event or a game in particular, several streams are broadcast toward a multimedia unit, for example a decoder. In particular, these streams are on one hand the file of the event in the form of an encrypted data stream and on the other hand a control message stream allowing the decryption of the data stream. The content of the data stream is encrypted by at least one "control word" (CW) and more generally by control words that are renewed regularly. This second stream is called ECM stream (Entitlement Control Message) and can be formed in two different ways. According to a first method, the control words are encrypted by a key, called a transmission key TK that generally pertains to the transmission system between a management center and a security module associated with the receiver/decoder. The control word is obtained by decrypting the ECM control messages by means of the transmission key TK.

According to a second method, the ECM stream does not contain directly the encrypted control words, but rather contains data allowing the determination of the control words. This determination of the control words can be carried out by means of different operations, in particular by decrypting, this decryption being able to obtain the control word directly, which corresponds to the first method described above, but the decryption can also result to a piece of data which contains the control word, the latter must also be extracted from the data. In particular, the data can contain the control word as well as a value associated to the content to be broadcast and in particular the access conditions to this content. Another operation allowing the determination of the control word can use, for example, a one-way hashing function of this access conditions information in particular.

The security operations are generally carried out in a security module associated to the multimedia unit or to the decoder. This type of security module can be produced in particular according to four distinct forms. One of these is a microprocessor card, a smart card, or more generally an electronic module (in the form of a key, a badge, etc.). This type of module is generally removable and can be connected to the decoder. The form with electric contacts is the most widely used, but does not exclude a connection without contact for example ISO 14443.

A second known form is that of an integrated circuit shell placed, generally in a definitive and irremovable way in the decoder board. An alternative is made up of a circuit mounted on a base or a connector such as a SIM module connector.

In a third form, the security module is integrated into an integrated circuit shell that also has another function, for example in a descrambling module of the decoder or the microprocessor of the decoder.

In a fourth embodiment, the security module is not produced as hardware, but rather its function is implemented only in the software form. Given that in the four cases, although the security level differs, the function is identical, reference is made to a security module regardless of the way in which its function is carried out or the form that this module can take.

The user unit receiving the data stream and the message stream extracts the messages in order to transmit them to the security module. As the messages arrive at the same time as the data, the security module can transmit the active control word as early as this is necessary. According to the systems used, a control message can comprise more than one control word, for example two, so that the user unit constantly disposes of the current control word and of the following control word.

It is possible that in addition to the use of the event in broadcast mode, this same event is stored on the hard disk of the user unit for subsequent use. This process raises two problems, namely the definition of the access conditions and the renewal of the transmission key TK.

The first problem to arise concerns the management of the access to this content, namely that the conditions for one broadcast mode can be different to the conditions of a different mode. One solution is to multiply the access conditions in the control message as described in the document WO01/80563.

In order to resolve the second problem, it has been proposed to create a key safe on the hard disk to memorize the transmission key TK valid at the time of the transmission of the event (see WO03/079683).

The content distribution operators require a more flexible solution that offers the same advantages.

The document WO03/107665 describes a solution including the creation of an index list formed at the time of the reception of the content and the control messages. The control messages broadcast with the content are stored and subsequently re-used with the index file. In the case that the broadcast messages are not applicable for subsequent use, this document does not teach anything regarding how to solve this problem.

The document EP1215905 describes a solution in which the content is transmitted with a list containing the control word associated to each part of the content. This list contains an identifier allowing a link to be made between the content broadcast and the control words stored in the list. This list is prepared at a managing center and broadcast with the content to allow the synchronization of the control words and the content.

Document EP1187477 discloses a personal video recorder (PVR) which receives a broadcast data stream and encrypts data extracted from the stream before storing on a disk. The key used for the encryption is specific to each PVR and is preferably randomly generated.

Document: WO00/57636A1 discloses a set-top box which provides received content that satisfies the conditional access scheme to a descrambling and encrypting module via a coupling. The set-top box scrambles the content it passes to the module in order to prevent a malicious user from tapping into the signal passed between the set top box and module and inappropriately using the content. The module receives the scrambled content from set-top box and descrambles the content. The module knows the manner in which content from the set top box is scrambled and is thus able to de-scramble such content. In order to maintain the security of the de-scrambled content inside the system, the media content is also encrypted by the module. This encryption is based on a household identifier corresponding to a smart card. By so encrypting the media content, the content is tied to a particular household. In one implementation, all content is encrypted by the module. Alternatively, only content which is received in scrambled format may be encrypted, or some other indicator of which content to encrypt may be used (e.g., header information in the received content, pre-defined date and/or time ranges of content to be encrypted, etc.). By encrypting the media content using a smart card, and correspondingly requiring a smart card for decryption, limitations are placed on the ability to playback the content. This effectively creates a boundary to the user's network, the boundary being defined by wherever the smart card goes. This effective boundary prevents a malicious user from copying useable media content to a server on the Internet.

Problem to be Solved

Live streams, which are encrypted with a plurality of control words, according to a crypto-period, have to be first decrypted then re-encrypted by a local key when recorded. The need for this re-encryption is for the receiver decoder to "index" the stream so that when the recorded stream played back can be easily manipulated: for example for fast forward.

The main issue with a standard receiver decoder connected to a security module is that when decrypted, the stream is "in clear" in the receiver decoder, even if the re-encrypted content is secured by a local key. This local key is considered as easily accessible by a third party or a hacker. This is why, only authorized stream can be recorded, i.e. the user has the right to access to the content. The standard Push-VOD (Push Video On Demand) is a technique used by a number of broadcasters on systems that lack connectivity to provide true video on demand or by broadcasters who wants to optimize their video streaming infrastructure by pre-loading the most popular contents to a consumer device. A push VOD system uses a personal video recorder (PVR) to store a selection of content, often transmitted in spare capacity overnight or all day long at low bandwidth. Users can watch the downloaded content at the time they desire, immediately and without any buffering issue.

An encrypted stream is pushed with an index but this is limited to specific defined content. The main issue is that it seems not yet possible to securely record a stream with a "pay later" concept.

A live VOD concept needs a fast interface between the receiver decoder and a secure device such as a smart card. Such interfaces are meant for having the full streams descrambled by the secure device instead of the receiver decoder.

SUMMARY OF THE INVENTION

In order to solve the above-mentioned problem, the present invention aims to provide a system for broadcasting and recording a content stream, a method to record the content in a mass memory of a multimedia unit and a secure device for implementing the method.

This aim is reached by a system for broadcasting and recording content digital data comprising a managing center adapted to prepare and transmit scrambled content digital data together with entitlement control messages comprising at least one control word and access conditions relative to the content, a multimedia unit configured for receiving and recording in a mass memory the content digital data, a secure device connected to the multimedia unit and adapted to descramble the scrambled content digital data with the control word characterized in that the secure device is configured for:

generating a content specific key obtained by carrying out a cryptographic operation combining a root key specific to the secure device and an information block relative to the content digital data, encrypting the previously descrambled content digital data with the content specific key, obtaining an encrypted content, forwarding the encrypted content digital data together with the information block to the mass memory of the multimedia unit for recording.

The idea consists of having a conversion (i.e. decryption) by a secure device of a standard pay TV secured transport stream in a scrambled pay TV event i.e. the conversion of a crypto-periods based stream in a pay TV event (one key for the event) for later view. The converted event then can be consumed after been stored as for example. pay per view of an event stored in a mass memory (hard disk) of a multimedia unit such as a set top box but still fully relies on the security of the secure device. The conversion aims at firstly descrambling the content using control words included in entitlement control messages and immediately re-encrypting the descrambled content by a unique key, this key being generated specifically for this content. Access conditions attached to the entitlement control message containing the control word are temporarily stored and once the decryption is terminated, the secure device produces an information block. This information block containing for example access conditions and an identifier of the content is either stored into a secure memory of the secure device or stored in the mass memory with the encrypted content. The unique key is made up of a combination of a root key specific to the secure device and the information block.

BRIEF DESCRIPTION OF THE DRAWINGS

The invention will be better understood with the following detailed description, which refers to the attached figures given as non-limitative examples.

DETAILED DESCRIPTION

Figure 1:
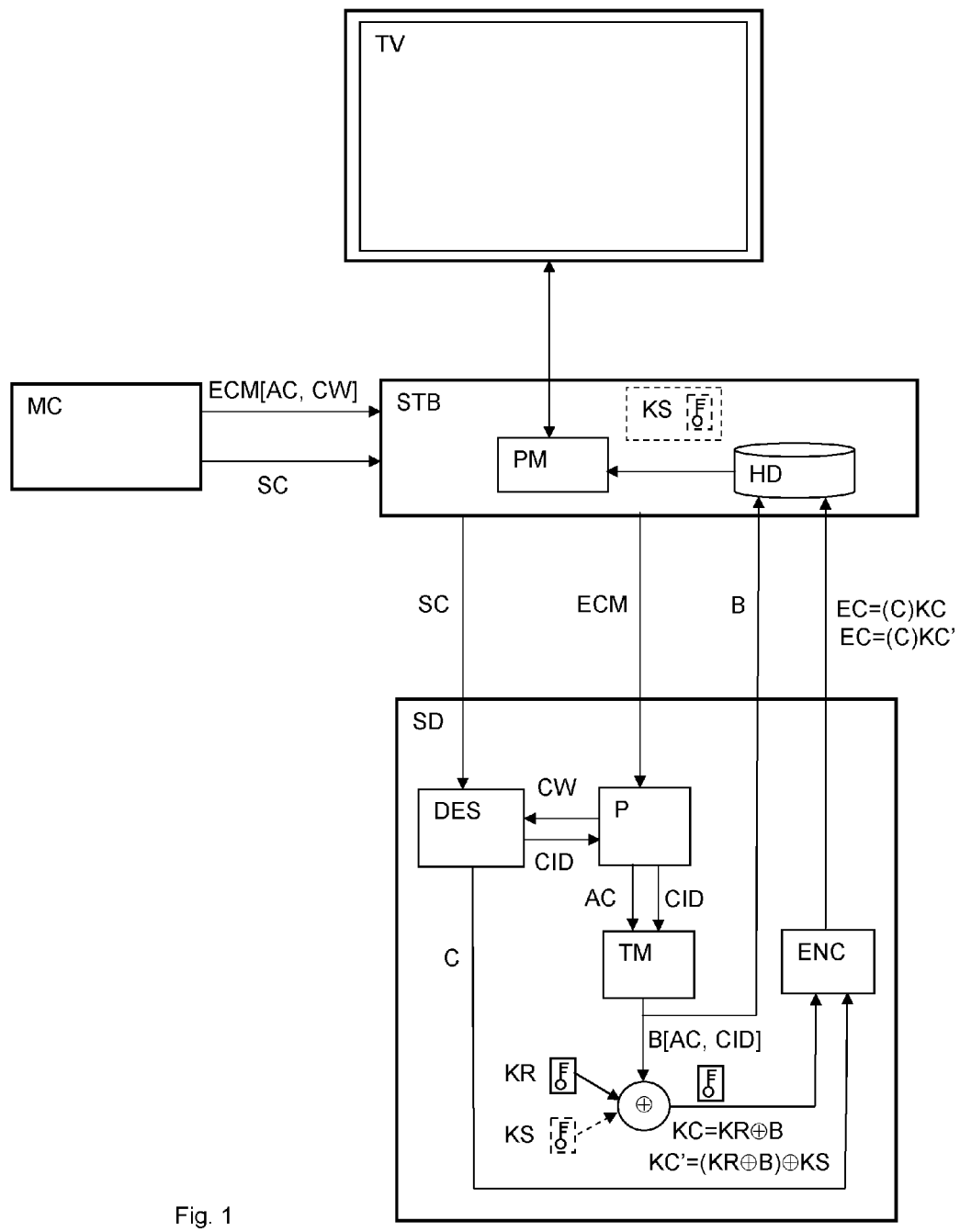
FIG. 1 shows a block schematic of the system according to the invention performing recording on a mass memory of the multimedia unit a content re-encrypted by the secure device.

The system as illustrated by FIG. 1 comprises a managing center MC or head end providing a stream of content digital data and a stream of entitlement control messages ECM associated to the content digital data. These streams are broadcast to a multimedia unit STB connected to a secure device SD. The multimedia unit STB is associated to or integrated in a TV set having an appropriate screen for viewing received content. The system an the method of the invention applies particularly to VOD (Video on Demand) where a user selects a television event on a list displayed on the television screen for later viewing which requires recording the selected content on a mass memory HD included in the multimedia unit STB. In this case, the content may be purchased when the user selects a content recorded in the mass memory for playing back. Alternatively content may be purchased before recording and its viewing is limited in time by access conditions accompanying the content. In both modes of immediate and later purchasing, the content has to be protected by the secure device SD against misusing such as illegal access, copying or distributing via networks.

The content digital data is associated to ECM control messages comprising at least one or several control words CW and access conditions AC related to the content. At reception for recording by the multimedia unit STB, the scrambled content SC and the ECM control messages are forwarded to the secure device SD for descrambling by a descrambler DEC integrated in the secure device SD. A processor P decrypts the ECM control message with a transmission key known be the secure device SD and extracts the control word CW which is made available to the descrambler DEC. The descrambled content C is immediately re-encrypted by an encryption module ENC with a key KC generated by the secure device SD on the basis of a root key KR specific to said secure device SD. The re-encryption key KC is also specific to the content thanks to a cryptographic operation, symbolized by $\oplus$, carried out for combining the root key KR and an information block B relative to the content C. The root key KR is thus diversified by the cryptographic operation which allows obtaining a key KC for each identified content.

The information block B comprises at least a content identifier CID and/or access conditions AC extracted from the ECM control message during its processing for retrieving the control word CW. The content identifier CID is generally provided during the descrambling operation. The information block is stored in a temporary memory TM and retrieved at calculation of the content specific key KC. The cryptographic operation $\oplus$ is preferably not reversible such as a hash function executed on a chain including the root key KR and the information block B or any other cryptographic irreversible operation. A reversible operation such as XOR could allow finding more easily the root key since the content identifier CID and the access conditions AC are not hidden. Access conditions AC may be defined by a content viewing time limitation, a number of viewing within a predefined time period, parent control needing a password to view a selected content, etc.

According to the invention the secure device SD is provided with a fast processor or appropriate hardware accelerator which performs the descrambling and the re-encryption operations "on the fly" so that the content C in clear is not exposed to illegal use. At the input of the secure device SD the content C data is scrambled by the control words while at the output it is re-encrypted with the content key before being forwarded to the multimedia unit STB and the mass memory HD.

Another advantage is that the root key KR, the cryptographic operation (s) and format used for combining the root key KR and the information block B are stored in a secure way only in the secure device SD and not in the mass memory HD or in anther insecure memory of the multimedia unit STB. It is also not necessary to store the content specific key KC with the encrypted content because the secure device SD knows how to rebuild this key KC by executing the cryptographic operation $\oplus$ with the information bloc B and the root key KR.

The re-encrypted content EC=(C)KC is then forwarded by the secure device SD to the multimedia unit STB for recording in the mass memory HD. The information block B is also forwarded to the multimedia unit STB to be recorded with the related re-encrypted content EC. The content identifier CID and/or the access conditions AC contained in the information block B are not considered as secrete since they do not allow decrypting the content or revealing the root key KR of the secure device SD. Therefore there is no particular need to encrypt the information block B. The only secrets are the root key KR of the secure device SD and the cryptographic operation $\oplus$ used to obtain the content specific keys KC.

According to an embodiment the information block B contains only the content identifier CID while the access conditions AC are stored in the temporary memory TM of the secure device SD.

Content specific keys KC based on the access conditions AC only may present a drawback because the access conditions AC may be identical for different contents and therefore different contents may be encrypted by a same content key KC.

According to a preferred embodiment, the multimedia unit STB and the secure device SD share a common secrete information KS. The secure device SD is therefore configured for encrypting the descrambled content C by an encryption key KC' obtained by carrying out a cryptographic operation combining the content specific key KC and said common secrete information KS. At recording the content is encrypted by the encryption key KC'=KC$\oplus$KS or KC'=(KR$\oplus$B)$\oplus$KS. The cryptographic operation carried out for obtaining the encryption key KC' from the content specific key KC may be the same than the cryptographic operation carried out for obtaining the content specific key KC from the root key KR. According to a configuration variant, these cryptographic operations may be distinct.

According to an embodiment, the common secrete information KS is formed by a symmetric key stored in a memory of the multimedia unit STB and in a memory of the secure device SD at setting up said multimedia unit STB with said secure device SD.

According to a further embodiment, the multimedia unit STB and the secure device SD are configured for sharing an encryption key KC' based on the content specific key KC by using a Diffie-Hellman algorithm. This encryption key KC' being used for encrypting the descrambled content C at recording or decrypting the encrypted content EC at playing back the content C.

The Diffie-Hellman key exchange is a specific method of exchanging keys allowing two parties that have no prior knowledge of each other to jointly establish a shared secret key over an insecure communications channel. This key can then be used to encrypt subsequent communications using a symmetric key cipher. The document U.S. Pat. No. 4,200,770 describes in detail this algorithm.

In the context of the present invention, the multimedia unit STB and the secure module SD exchange two large positive non trivial prime numbers a and b with a higher than b, (a>b).

The multimedia unit STB generates a random number x and calculates X=b^x mod a and sends the result X to the secure device SD. (mod a means modulo a and ^ is the exponentiation operation).

The secure device SD calculates the content specific key KC=KR$\oplus$B=y and Y=b^y mod a, and sends the result Y to the multimedia unit STB.

The multimedia unit STB calculates the encryption key KC'=Y^x=(b^y) ^x mod a, or KC'=(b^(KR⊕B))^x mod a, or KC'=(b^KC)^x mod a, or KC'=b^(KC*x) mod a, where * is the multiplication operation.

The secure device calculates also the encryption key KC' with by using the previously received result X=b^x which gives KC'=X^y=(b^x)^y mod a, or KC'=(b^x)^(KR⊕B) mod a, or KC'=(b^x)^KC mod a, or KC'=b^(x*KC) mod a.

In this way thanks to the equality of b^(KC*x) and b^(x*KC) both the multimedia unit STB and the secure device SD share the same key KC' without exchanging any secrete data.

This mechanism may be activated at purchasing a recorded content for building the encryption key KC'. In fact the secure device SD calculates KC=KR⊕B=y and Y=b^y mod a, only when a payment have been made by the user for a content specified by its identifier CID. The multimedia unit STB receiving the result Y can calculate the encryption key KC' on the basis of the content specific key KC.

Figure 2:
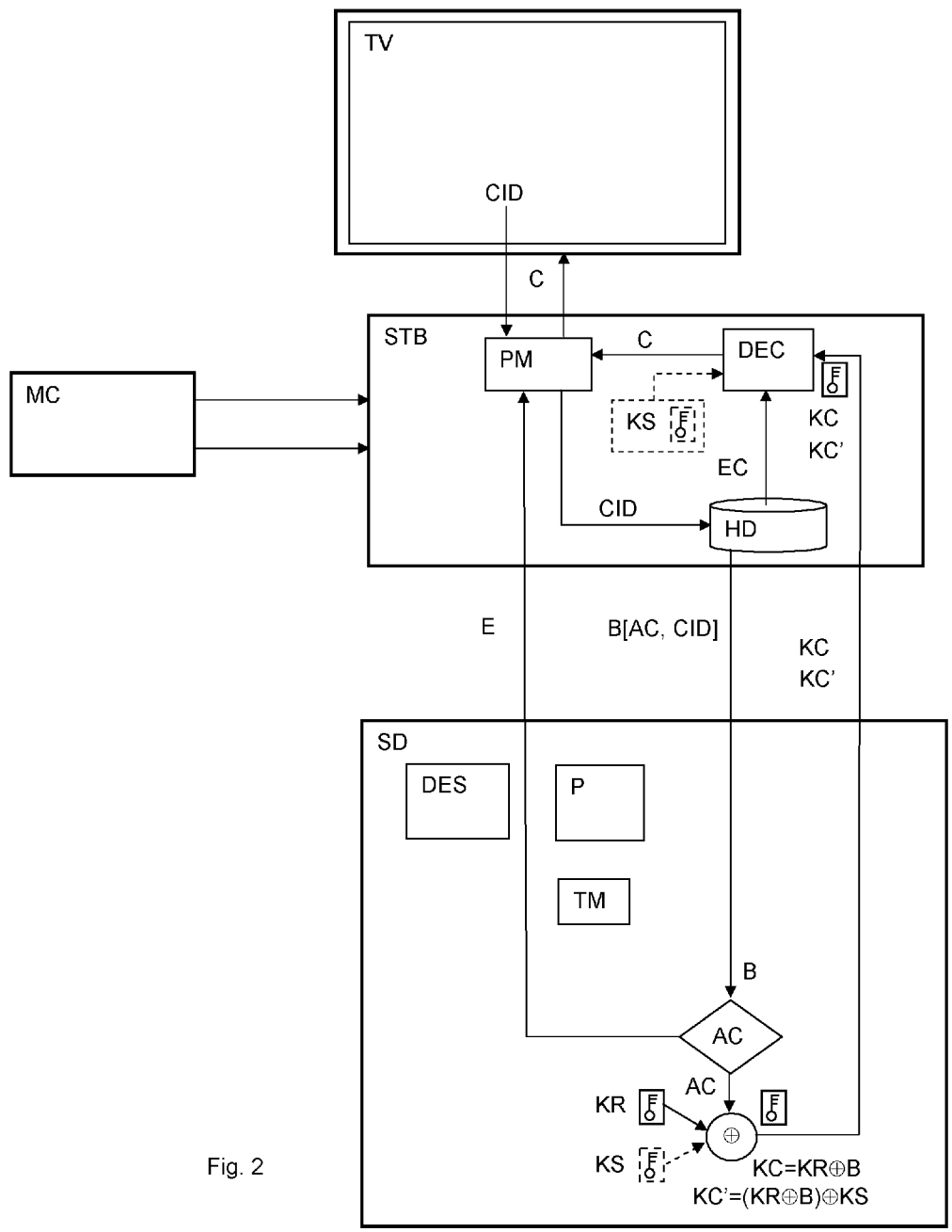
FIG. 2 shows a block schematic of the system according to the invention performing playing back of an encrypted content recorded in the mass memory.

For playing back a content C recorded in the mass memory HD of the multimedia unit STB, the user selects the content in a directory of recorded contents by using the identifier CID or a title or other item linked to the identifier. As illustrated by FIG. 2, the identifier CID is used to determine the information block B which is sent to the secure device SD. The information block B may also be formed in the secure device SD by retrieving the access conditions AC previously stored in the temporary memory TM. In another configuration, the information block B is stored in the mass memory together with the encrypted content EC and transmitted as is to the multimedia unit.

This information block B comprising the content identifier CID and/or the access conditions AC is used by the secured device SD to compute the content specific key KC=KR⊕B by carrying out the cryptographic operation ⊕ on the root key KR. The access conditions AC are checked before computing the content specific key KC. If the checking is unsuccessful as for example when the content validity time is expired, the secure device SD may return an error message E to the multimedia unit STB.

If the access conditions AC are fulfilled, the content specific key KC is calculated and forwarded to the multimedia unit STB where a decryption module DEC decrypts the recorded content EC with said content specific key KC. The decrypted content is then forwarded by the decryption module DEC to a playback module PM connected to the TV set for viewing.

According to an embodiment the information block B is checked for conformity by using for example a checksum calculated on the identifier CID and/or the access conditions AC. If the checksum is wrong the content decryption becomes not possible and an appropriate message is sent to the TV set for display. Other checking means may be applied such a MAC (Message Authentication Code), a Hash or a signature.

According to a further embodiment the content decryption key (encryption key KC') is determined on the basis of secrete information KS shared by the secure device SD and the multimedia unit STB in addition to the root key KR and the information block B in the same way as by recording the content. The decryption module DEC of the multimedia unit STB decrypts the recorded content EC by using the encryption key KC'=(KR⊕B)⊕KS., cf. FIG. 2.

According to a further embodiment, the decryption of the content may be performed by the secure device SD instead the multimedia unit STB. In this case, the encrypted content EC is forwarded to the secure device SD while the decrypted content is transmitted to the multimedia unit STB. This configuration requires two high bandwidth fast channels between the secure device SD and the multimedia unit STB which is not necessarily an advantage.

According to a further embodiment, the communication channel between the secure device SD and the multimedia unit STB may be secured by a pairing or matching mechanism as described for example in the document EP1078524B1, which pairing key is known by the secure device SD and the multimedia unit STB.

According to a further embodiment, the secure device SD and the multimedia unit STB may be connected via a network as for example in a home network where a same remote secure device manages a plurality of multimedia units STB. In this configuration, the transmission of secrete data such as decryption keys may be prevented by using for example key exchanging methods based on Diffie-Hellman algorithm.

The invention claimed is:

1. A system for broadcasting and recording content digital data comprising:
   a managing center adapted to prepare and transmit scrambled content SC digital data together with entitlement control messages including at least one control word and access conditions AC relative to the content C;
   a multimedia unit configured to receive and record, in a mass memory, the content C digital data;
   a secure device connected to the multimedia unit and adapted to descramble the scrambled content SC digital data with the control word, the secure device being at least configured to:
   generate a content specific key KC=KR⊕B obtained by carrying out a cryptographic operation ⊕ combining a root key KR specific to the secure device and an information block B relative to the content C digital data,
   encrypt the previously descrambled content C digital data with the content specific key KC, obtaining an encrypted content EC=(C)KC, and
   forward the encrypted content digital data EC together with the information block B to the mass memory of the multimedia unit for recording.

2. The system according to claim 1 wherein the multimedia unit and the secure device share a common secrete information KS, the secure device being configured to encrypt the descrambled content C by an encryption key KC' obtained by carrying out a cryptographic operation combining the content specific key KC and said common secrete information KS.

3. The system according to claim 2 wherein the common secrete information KS is formed by a symmetric key stored in a memory of the multimedia unit and in a memory of the secure device at setting up said multimedia unit with said secure device.

4. The system according to claim 1 wherein the multimedia unit is adapted to playback an encrypted content EC recorded on the mass memory, the secure device being at least configured to:
   receive information based on an identifier CID associated to a recorded content C to playback;
   check the access conditions AC corresponding to the content C to playback;
   if the access conditions are fulfilled, obtaining the content specific key KC=KR⊕B by carrying out the cryptographic operation ⊕ combining the root key KR specific to the secure device and the information block B stored with the encrypted content EC; and
   forwarding the content specific key KC to the multimedia unit, said multimedia unit comprising a decryption module adapted to decrypt the encrypted content EC with the content specific key KC and to forward the decrypted content to a playback module of the multimedia unit.

5. The system according to claim 4 wherein the multimedia unit and the secure device share a common secrete information KS, the multimedia unit being further configured to determine an encryption key KC' on the basis of the common secret information KS, the decryption module being adapted to decrypt the encrypted content EC with the encryption key KC' obtained by carrying out a cryptographic operation combining the content specific key KC and said common secrete information KS.

6. The system according to claim 1 wherein the multimedia unit and the secure device are configured for sharing an encryption key KC' based on the content specific key KC by using a Diffie-Hellman algorithm, said encryption key KC' being used for encrypting the descrambled content C or decrypting the encrypted content EC.

7. The system according to claim 1 wherein the information block B comprises at least an identifier CID of the content C, the access conditions AC being stored in a temporary memory of the secure device.

8. The system according to claim 1 wherein the information block B comprises at least the access conditions AC relative to the content C.

9. The system according to claim 1 wherein the information block B comprises at least an identifier CID of the content C and the access conditions AC relative to said content C.

10. A method for recording broadcast content C digital data in a mass memory of a multimedia unit, said content C digital data being received by the multimedia unit in a scrambled form together with entitlement control messages ECM comprising at least one control word CW and access conditions AC relative to the content C, the method comprising:
descrambling, by a secure device connected to the multimedia unit, the received scrambled content SC digital data with the control word CW, the descrambling comprising:
generating by the secure device, a content specific key KC=KR⊕B obtained by carrying out a cryptographic operation ⊕ combining a root key KR specific to the secure device and an information block B relative to the content C digital data,
encrypting the previously descrambled content C digital data with the content specific key KC, obtaining an encrypted content EC=(C)KC, and
forwarding the encrypted content digital data EC together with the information block B to the mass memory of the multimedia unit for recording.

11. The method according to claim 10 wherein a common secrete information KS is shared by the multimedia unit and the secure device and used by the secure device for obtaining an encryption key KC' by carrying out a cryptographic operation combining the content specific key KC and said common secrete information KS, said secure device encrypting the descrambled content C by using said encryption key KC'.

12. The method according to claim 10 wherein an encrypted content EC recorded on the mass memory is played back by the multimedia unit, the secure device carrying out at least:
receiving information based on an identifier CID associated to a recorded content C to playback;
checking the access conditions AC corresponding to the content C to playback;
if the access conditions are fulfilled, obtaining the content specific key KC=KR⊕B by carrying out the cryptographic operation ⊕ combining the root key KR specific to the secure device SD and the information block B stored with the encrypted content EC;
forwarding the content specific key KC to the multimedia unit, said multimedia unit decrypting with a decryption module DEC the encrypted content EC by using the content specific key KC; and
forwarding the decrypted content to a playback module of the multimedia unit.

13. The method according to claim 12 wherein a common secrete information KS is shared by the multimedia unit and the secure device, said common secrete information KS being used by the multimedia unit for obtaining an encryption key KC' by carrying out a cryptographic operation combining the content specific key KC and said common secrete information KS, said multimedia unit decrypting with a decryption module DEC the encrypted content EC by using the encryption key KC'.

14. The method according to claim 12 further comprising:
checking the conformity of the information block B by the secure device, the access conditions AC being checked only when the information block B conformity checking is successful.

15. The method according to claim 10 wherein the multimedia unit and the secure device share an encryption key KC' based on the content specific key KC by using a Diffie-Hellman algorithm, said encryption key KC' being used for encrypting the descrambled content C or decrypting the encrypted content EC.

16. A secure device, connected to a multimedia unit including a mass memory storing scrambled content SC digital data together with entitlement control messages including at least one control word and access conditions AC relative to the content C, adapted to descramble the scrambled content SC digital data with a control word, the secure device being at least configured to:
generate a content specific key KC=KR⊕B obtained by carrying out a cryptographic operation ⊕ combining a root key KR specific to the secure device and an information block B relative to the content C digital data,
encrypt the previously descrambled content C digital data with the content specific key KC, obtaining an encrypted content EC=(C)KC, and
forward the encrypted content digital data EC together with the information block B to the mass memory of the multimedia unit for recording.

17. The secure device according to claim 16 wherein the multimedia unit and the secure device share a common secrete information KS, the secure device being configured to encrypt the descrambled content C by an encryption key KC' obtained by carrying out a cryptographic operation combining the content specific key KC and said common secrete information KS.

18. The secure device according to claim 16 wherein the multimedia unit is adapted to playback an encrypted content EC recorded on the mass memory, the secure device being at least configured to:
receive information based on an identifier CID associated to a recorded content C to playback;
check the access conditions AC corresponding to the content C to playback;
if the access conditions are fulfilled, obtaining the content specific key KC=KR⊕B by carrying out the cryptographic operation ⊕ combining the root key KR specific to the secure device and the information block B stored with the encrypted content EC; and
forwarding the content specific key KC to the multimedia unit, said multimedia unit comprising a decryption module adapted to decrypt the encrypted content EC with the content specific key KC and to forward the decrypted content to a playback module of the multimedia unit.

* * * * *